(No Model.) 2 Sheets—Sheet 1.

U. DREESMAN & S. H. PUTERBAUGH.
SCALDER.

No. 458,803. Patented Sept. 1, 1891.

Witnesses
Albert Popkins
F. F. Arnold

Inventors
Udo Dreesman
Samuel H. Puterbaugh
By their Attorney
W. H. Ruff (No Model.) 2 Sheets—Sheet 2.

U. DREESMAN & S. H. PUTERBAUGH.
SCALDER.

No. 458,803. Patented Sept. 1, 1891.

Witnesses
Albert Popkins
John Johns

Inventors
Udo Dreesman
S. H. Puterbaugh
By W. D. Ruff
Attorney

UNITED STATES PATENT OFFICE.

UDO DREESMAN AND SAMUEL H. PUTERBAUGH, OF TREMONT, ILLINOIS.

SCALDER.

SPECIFICATION forming part of Letters Patent No. 458,803, dated September 1, 1891.

Application filed January 26, 1891. Serial No. 379,155. (No model.)

*To all whom it may concern:*

Be it known that we, UDO DREESMAN and SAMUEL H. PUTERBAUGH, of Tremont, in the county of Tazewell and State of Illinois, have invented certain new and useful Improvements in Scalders and Scourers; and we do hereby declare the following to be a full, clear, and exact description of the invention, such as will enable others skilled in the art to which it appertains to make and use the same.

Our invention relates to an improvement in scalding devices, the object of the same being to provide means for the above purpose by which hogs and other similar animals may be readily and quickly placed into and removed from the scalder by a very simple and convenient device.

A further object is to provide means of the above character which will be simple and economical in construction and durable and efficient in use.

With the above objects in view our invention consists in the certain features of construction and combinations of parts which will be hereinafter fully described, and pointed out in the claim.

Figure 1:
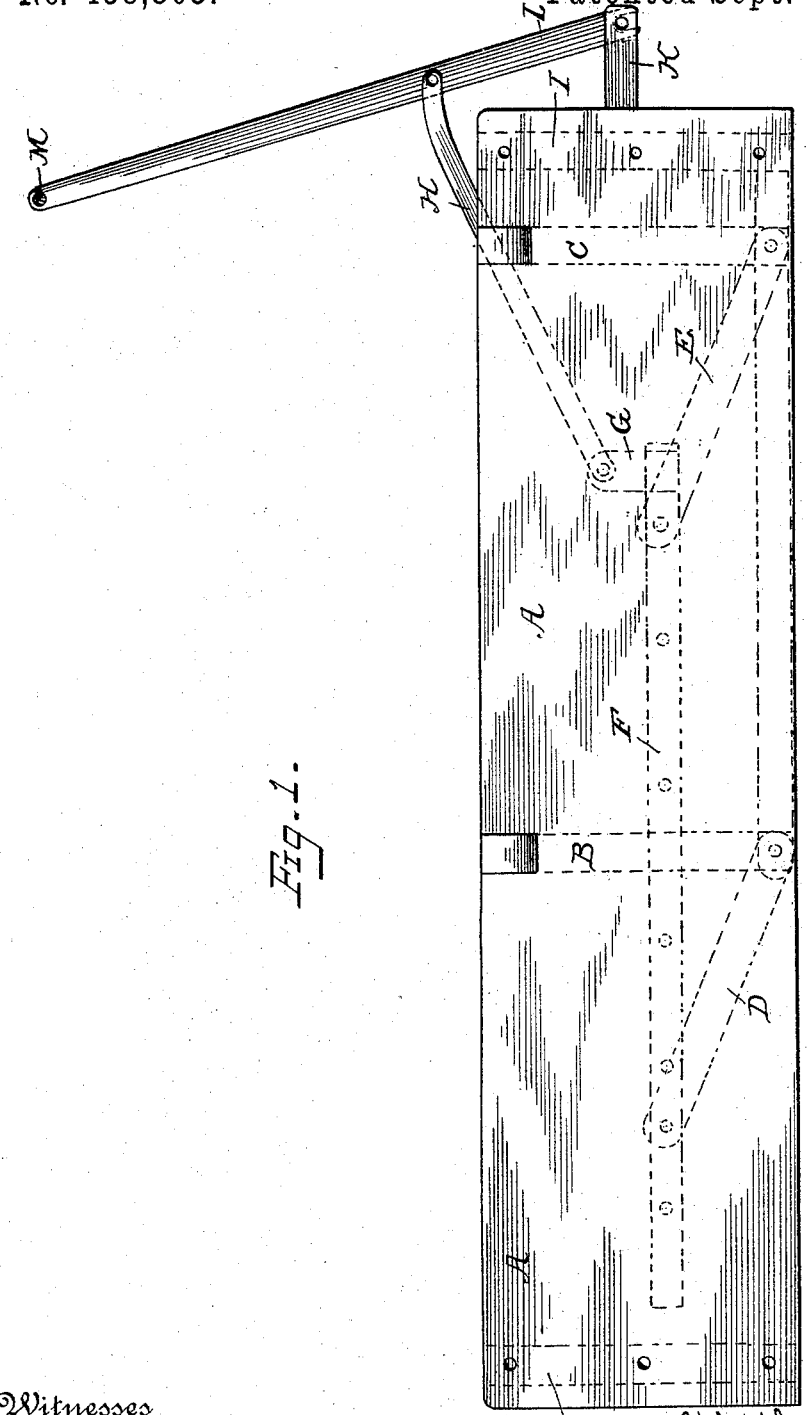
Figure 2:
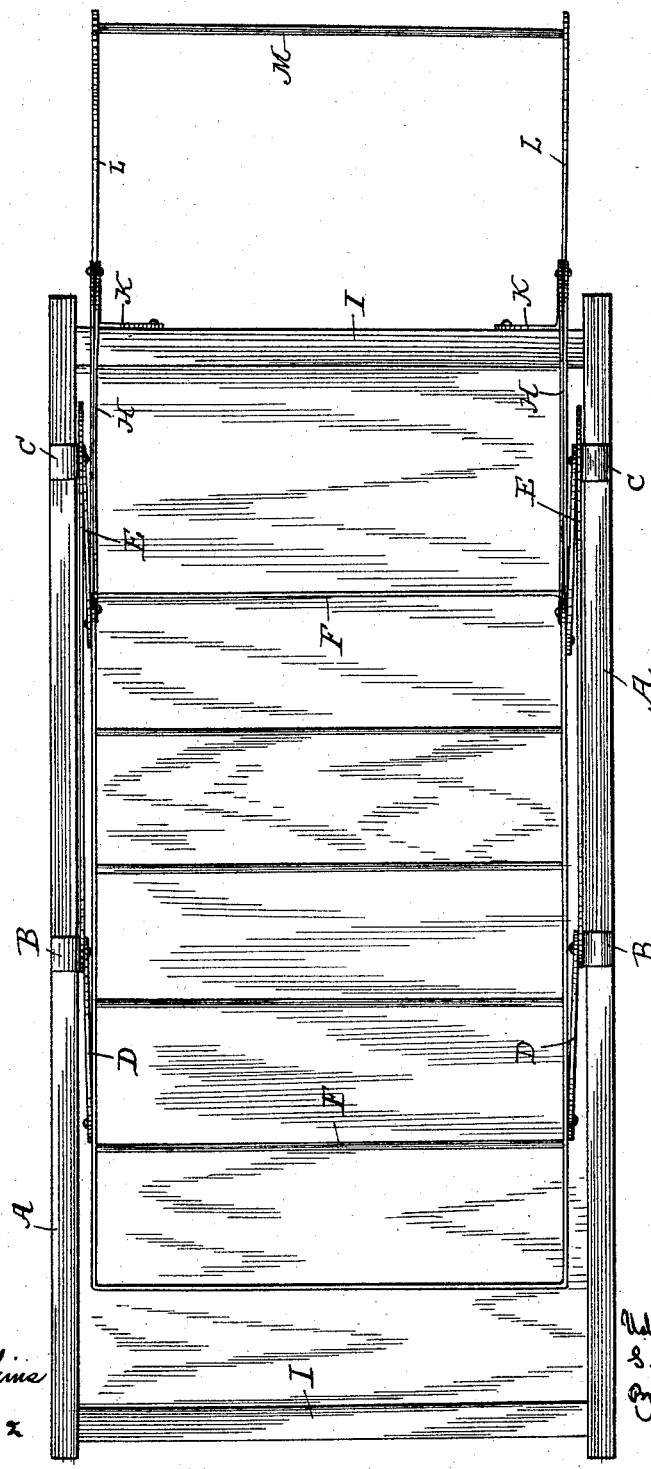

In the accompanying drawings, Figure 1 is a side elevation of the device, with the dotted lines illustrating the position of the rack when in lowered adjustment; and Fig. 2 is a plan view.

A represents the boiler of ordinary construction, but preferably oblong, as shown. The boiler is provided on the interior with the metallic pieces B and C, to which are pivoted the arms D and E. To the said arms D and E is pivoted the grid or rack F, one end of which is provided with the elbow G. To the said elbows are pivoted the bifurcated rods H, the same being slightly curved downward at the opposite ends to afford a free passage over the end I of the boiler. To the end I are secured the clips K, the same being adapted to receive the levers L, which are pivotally secured thereto. The said levers are provided with the connecting-handle M. By means of the construction shown it is readily understood that by placing the animal on the grid and elevating the levers L the same will be lowered into the boiler, as shown in dotted lines, and that by lowering said levers the grid and its occupant will be brought to the surface.

Having fully described our invention, what we claim as new, and desire to secure by Letters Patent, is—

In a scalding device, the combination, with the boiler, of a rack or grid pivotally secured therein, pieces B and C, secured to said rack or grid, bifurcated rods H, pivoted to said grid, clips K, secured to the boiler, and levers L, pivotally secured to the rods H and clips K, substantially as shown and described.

In testimony whereof we have signed this specification in the presence of two subscribing witnesses.

UDO DREESMAN.
    SAMUEL H. PUTERBAUGH.

Witnesses:
    THOMAS B. HOLT,
    F. R. EGGER.